(12) United States Patent
Kim

(10) Patent No.: US 9,372,559 B2
(45) Date of Patent: Jun. 21, 2016

(54) TOUCH SCREEN, METHOD OF MANUFACTURE THE SAME, AND MOBILE TERMINAL HAVING THE SAME

(71) Applicant: Samsung Electronics Co. Ltd., Suwon-si, Gyeonggi-do (KR)

(72) Inventor: Dongsub Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 340 days.

(21) Appl. No.: 13/788,586

(22) Filed: Mar. 7, 2013

(65) Prior Publication Data

US 2013/0241855 A1   Sep. 19, 2013

(30) Foreign Application Priority Data

Mar. 13, 2012   (KR) ........................ 10-2012-0025685

(51) Int. Cl.
*G06F 3/041* (2006.01)

(52) U.S. Cl.
CPC ...... *G06F 3/041* (2013.01); *G06F 2203/04102* (2013.01); *Y10T 29/49826* (2015.01)

(58) Field of Classification Search
CPC ........... G06F 3/041; G06F 2203/04102; Y10T 29/49826
USPC ......................................................... 345/173
See application file for complete search history.

(56) References Cited

U.S. PATENT DOCUMENTS

| | | | |
|---|---|---|---|
| 2006/0038745 A1* | 2/2006 | Naksen | G06F 1/1624 345/30 |
| 2009/0021666 A1* | 1/2009 | Chen | G02F 1/133305 349/58 |
| 2010/0277448 A1* | 11/2010 | Okamoto | G02F 1/133305 345/206 |
| 2011/0007042 A1* | 1/2011 | Miyaguchi | G02F 1/133305 345/204 |
| 2011/0050657 A1* | 3/2011 | Yamada | H01L 27/3293 345/204 |
| 2012/0106122 A1* | 5/2012 | Ryu | G02F 1/133608 362/19 |
| 2012/0212433 A1* | 8/2012 | Lee | G06F 1/1652 345/173 |
| 2013/0002583 A1* | 1/2013 | Jin | G06F 1/1637 345/173 |
| 2013/0063891 A1* | 3/2013 | Martisauskas | G06F 1/1643 361/679.56 |
| 2014/0002385 A1* | 1/2014 | Ka | G06F 1/1601 345/173 |
| 2014/0009400 A1* | 1/2014 | Poorter | G06F 3/041 345/173 |
| 2014/0104185 A1* | 4/2014 | Hu | G06F 3/044 345/173 |
| 2015/0236052 A1* | 8/2015 | Okamoto | H01L 27/1225 257/43 |

* cited by examiner

*Primary Examiner* — Amare Mengistu
*Assistant Examiner* — Jennifer Zubajlo
(74) *Attorney, Agent, or Firm* — Jefferson IP Law, LLP

(57) ABSTRACT

A touch screen, a method of manufacturing the same, and a mobile terminal having the same for minimizing a border area of the mobile terminal are provided. The touch screen includes a flexible display panel including an active area in which an image is displayed and a wiring area including signal lines for transmitting data corresponding to the image, and a flexible touch panel attached to a front surface of the display panel and including a touch detection area at which touch sensors for detecting a touch are positioned and a wiring area at which signal lines for transmitting a touch signal are positioned, wherein the wiring area of the display panel and the wiring area of the touch panel are bent so as not to be parallel to the active area and the touch detection area.

15 Claims, 9 Drawing Sheets

TOUCH SCREEN, METHOD OF MANUFACTURE THE SAME, AND MOBILE TERMINAL HAVING THE SAME

PRIORITY

This application claims the benefit under 35 U.S.C. §119 (a) of a Korean patent application filed on Mar. 13, 2012 in the Korean Intellectual Property Office and assigned Serial No. 10-2012-0025685, the entire disclosure of which is hereby incorporated by reference.

BACKGROUND OF THE INVENTION

1. Field of the Invention

The present invention relates to a touch screen, a method of manufacturing the same, and a mobile terminal having the same. More particularly, the present invention relates to a touch screen, a method of manufacturing the same, and a mobile terminal having the same for minimizing a border area of the mobile terminal

2. Description of the Related Art

Nowadays, mobile terminals have a touch screen for input convenience. The touch screen includes a display panel and a touch panel.

FIG. 1 is a diagram illustrating a touch screen according to the related art.

Referring to FIG. 1, a display panel 131 of a touch screen 130 is divided into an active area 31a for displaying an image (i.e., a still image and a moving picture) and a non-active area 31b in which an image is not displayed. The active area 31a includes a data driving Integrated Circuit (IC) for supplying image data and a gate driving IC for supplying a scan signal. The non-active area 31b includes a wire for connecting the gate driving IC, the data driving IC, and a Printed Circuit Board (PCB) (not shown). In the PCB, various elements (e.g., a Liquid Crystal Display (LCD) Driver Interface (LDI)) are mounted for processing and/or converting an image signal from the outside to a signal appropriate for driving the display panel 131 and for supplying the processed and/or converted image signal to the gate driving IC and the data driving IC.

A touch panel 132 is disposed at a front surface of the display panel 131. The touch panel 132 includes a touch detection area 32a and a wiring area 32b. A touch sensor for detecting a touch is positioned at the touch detection area 32a. The wiring area 32b includes a plurality of wirings for connecting the touch sensor and a touch driver IC.

FIG. 2 is a front view illustrating an external appearance of a mobile terminal having a touch screen according to the related art.

Referring to FIGS. 1 and 2, a mobile terminal 100 has a rectangular shape, and a protection window 141, for protecting the touch screen 130, is positioned at a front surface thereof. A speaker 110 is positioned at an upper end portion of a main body of the mobile terminal 100, and function keys 150 are positioned at a lower end portion of the main body.

The protection window 141 may have a transparent area 41a and an opaque border area 41b. The border area 41b is formed in the mobile terminal 100 due to the non-active area 31b of the display panel 131 and the wiring area 32b of the touch panel 132. The border area 41b is formed by printing a specific color (e.g., a black color) in the protection window 141. The border area 41b enables the non-active area 31b of the display panel 131 and the wiring area 32b of the touch panel 132 not to be exposed to a user and prevents light leakage of the display panel 131.

FIG. 3 is a cross-sectional view illustrating a mobile terminal taken along line A-A' of FIG. 2 according to the related art.

Referring to FIGS. 1 through 3, the display panel 131 and the touch panel 132 are stacked in the touch screen 130, and the protection window 141 is disposed at the touch panel 132. The display panel 131 and the touch panel 132, and the touch panel 132 and the protection window 141 are bonded by adhesives 60, for example an Optically Clear Adhesive (OCA) or a synthetic resin. The touch screen 130 is mounted in the mobile terminal 100. In this case, the border area 41b of the protection window 141 is bonded to a case 101 of the mobile terminal 100 through a double-sided tape 50. A buffering material 10 (e.g., a sponge, a Poron foam, and the like), for performing a buffering operation by preventing the display panel 131 from being broken when an impact occurs, is disposed between the display panel 131 and a bracket 20. In this way, in order to prevent exposure of the non-active area 31b of the display panel 131 and the wiring area 32b of the touch panel 132, the mobile terminal 100 having a conventional touch screen requests a relatively wide border area 41b. Accordingly, the mobile terminal 100 of the related art has a design restriction wherein an entire size of the terminal is larger than necessary.

Therefore, a need exists for a method of minimizing a border area of a touch screen of a mobile terminal using a flexible display panel and a flexible touch panel.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method of minimizing a border area of a touch screen of a mobile terminal using a flexible display panel and a flexible touch panel.

Another aspect of the present invention is to provide a touch screen, a method of manufacturing the same, and a mobile terminal having the same for minimizing a border area of the mobile terminal by bending some area of a flexible display panel and a flexible touch panel.

In accordance with an aspect of the present invention, a touch screen is provided. The touch screen includes a flexible display panel including an active area in which an image is displayed and a wiring area including signal lines for transmitting data corresponding to the image, and a flexible touch panel attached to a front surface of the display panel and including a touch detection area at which touch sensors for detecting a touch are positioned and a wiring area at which signal lines for transmitting a touch signal are positioned, wherein the wiring area of the display panel and the wiring area of the touch panel are bent so as not to be parallel to the active area and the touch detection area.

In accordance with another aspect of the present invention, a mobile terminal having a flexible touch screen is provided. The flexible touch screen includes a flexible display panel including an active area in which an image is displayed and a wiring area at which signal lines for transmitting data corresponding to the image are positioned, and a flexible touch panel attached to a front surface of the display panel and including a touch detection area at which touch sensors for detecting a touch are positioned and a wiring area at which signal lines for transmitting a touch signal are positioned, wherein the wiring area of the display panel and the wiring area of the touch panel are bent so as not to be parallel to the active area and the touch detection area.

In accordance with another aspect of the present invention, a method of manufacturing a touch screen is provided. The method includes stacking a flexible display panel including an active area in which an image is displayed and a wiring area at which signal lines for transmitting data corresponding to the image are positioned and a flexible touch panel including a touch detection area at which touch sensors for detecting a touch are positioned and a wiring area at which signal lines for transmitting a touch signal are positioned, and bending the wiring area of the display panel and the wiring area of the touch panel so as not to be parallel to the active area and the touch detection area.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 4 through 9, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
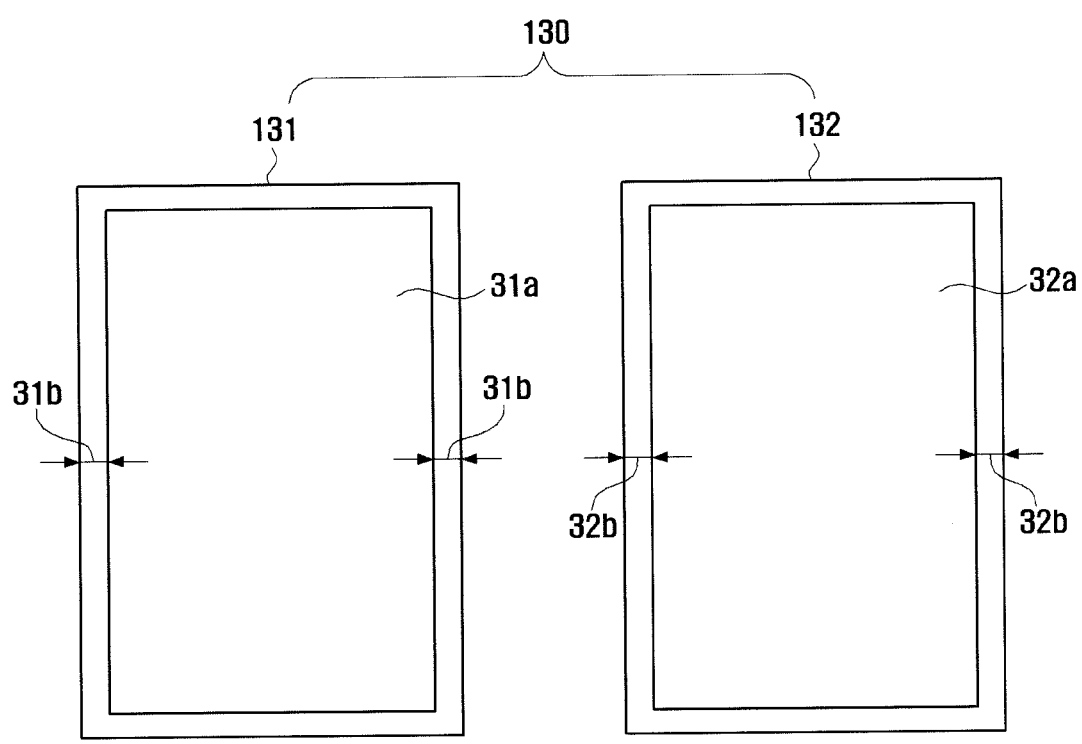
FIG. 1 is a diagram illustrating a touch screen according to the related art.
Figure 2:
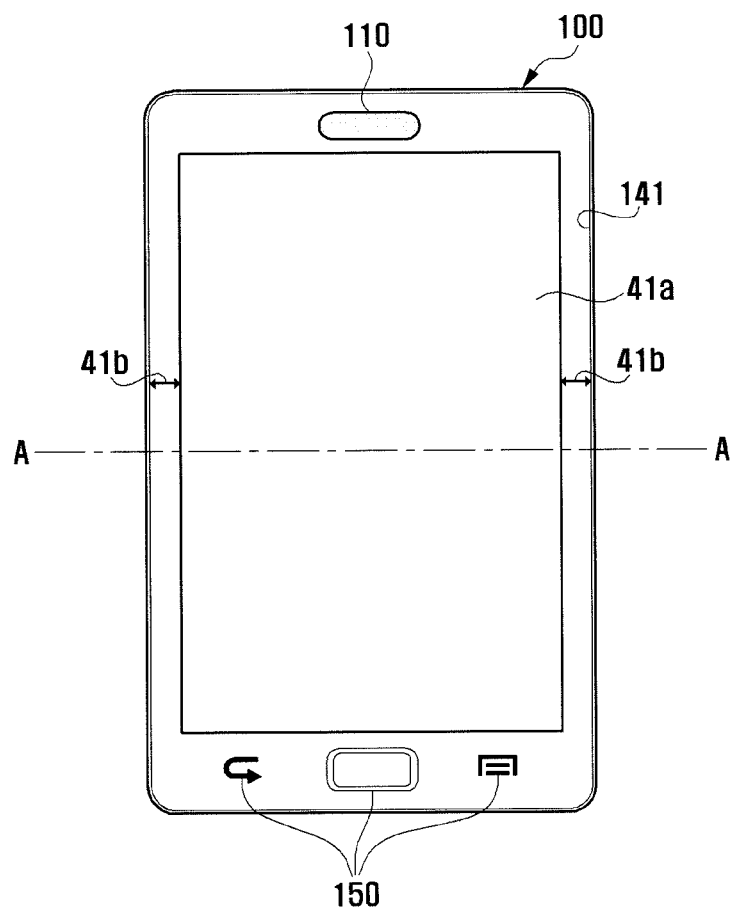
FIG. 2 is a front view illustrating an external appearance of a mobile terminal having a touch screen according to the related art.
Figure 3:
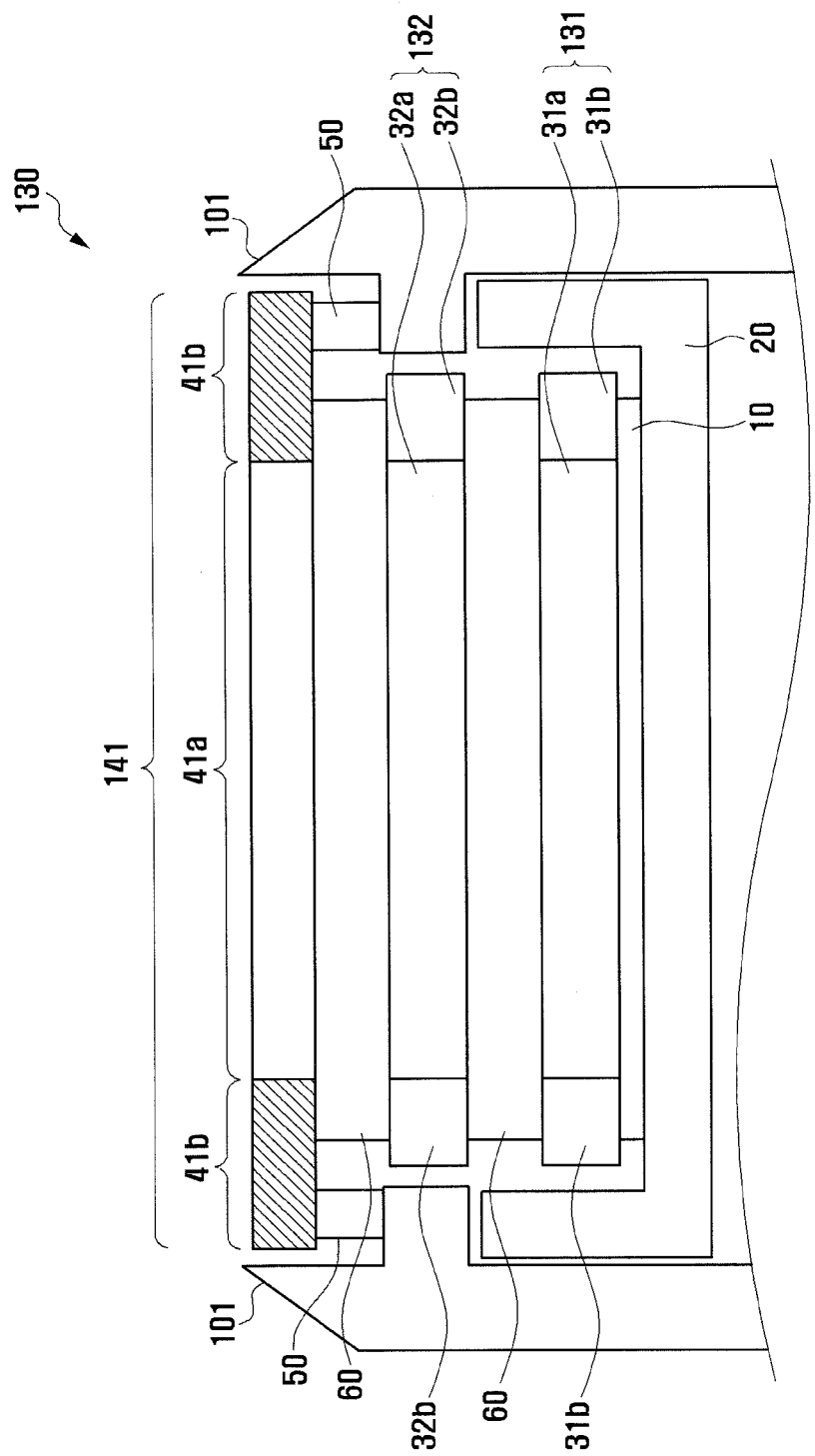
FIG. 3 is a cross-sectional view illustrating a mobile terminal taken along line A-A' of FIG. 2 according to the related art.
Figure 4:
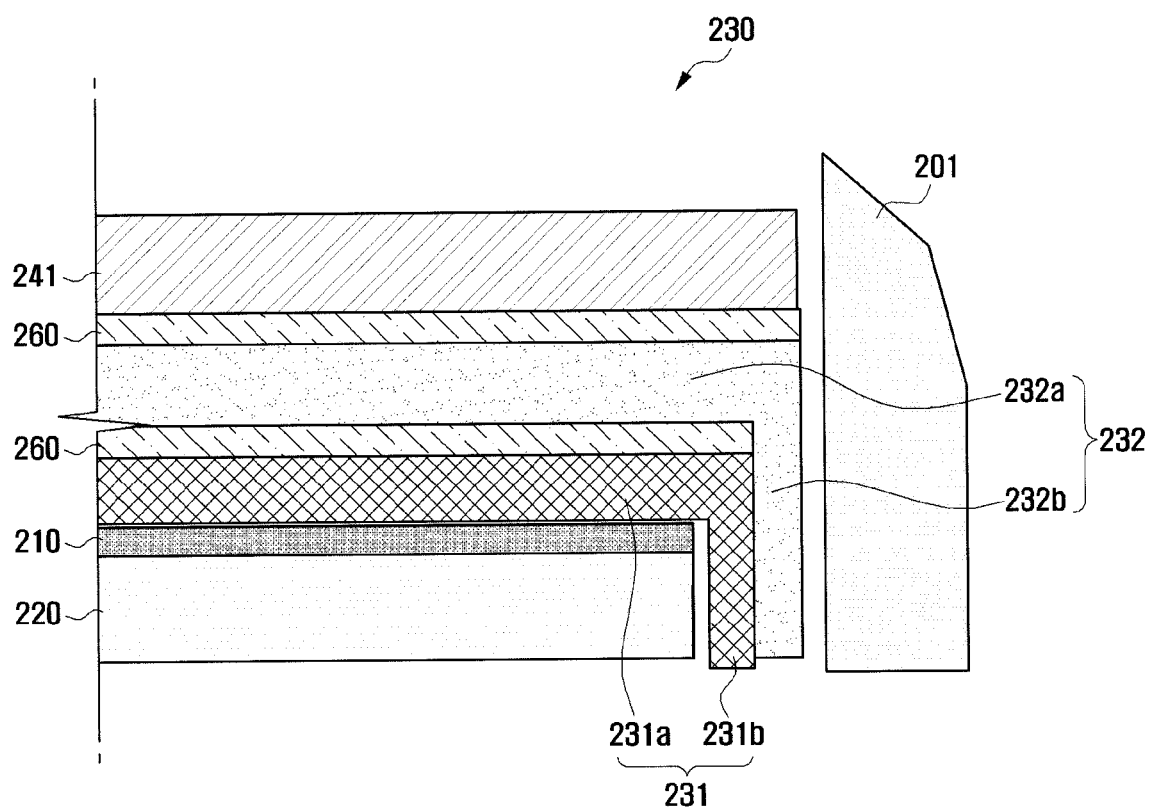
FIG. 4 is a cross-sectional view illustrating a mobile terminal having a touch screen according to an exemplary embodiment of the present invention.

FIG. 4 is a cross-sectional view illustrating a mobile terminal having a touch screen according to an exemplary embodiment of the present invention.

Referring to FIG. 4, a touch screen 230 may include a touch panel 232, a display panel 231, a protection window 241 attached to an upper end portion of the touch panel 232, and a bracket 220 attached to a lower end portion of the display panel 231.

The display panel 231 is a device for displaying an image and includes an active area 231a in which an actual image is displayed and a non-active area 231b (hereinafter, a wiring area) including signal lines for transmitting data corresponding to an image. More particularly, the display panel 231 may be a flexible display panel 231. Due to a flexible characteristic, when installed in the mobile terminal, the wiring area 231b of the display panel 231 is bent so as not to be parallel to the active area 231a. For example, as shown in FIG. 4, the wiring area 231b of the display panel 231 is bent by a predefined angle (e.g., 90°) from the active area 231a and is positioned between the bracket 220 and a case 201. In this case, the wiring area 231b of the display panel 231 may be attached to the bracket 220 according to a designer's intention. The case 201 may be a case of the mobile terminal or a case of the touch screen 230.

The touch panel 232 is a device for detecting a touch and is attached to a front surface of the display panel 231. The touch panel 232 may be flexible and may include a touch detection area 232a for detecting a touch and a wiring area 232b including a signal line for transmitting a touch signal to a touch driver Integrated Circuit (IC). In the touch panel 232, a driving channel for detecting the abscissa and a detecting channel for detecting the ordinate may be made of a metal (e.g., silver, copper, and aluminum) mesh. This is to prevent a disconnection of the wiring area 232b of the touch panel 232 from signal lines due to a certain cause, such as a crack, when the wiring area 232b is bent by a predefined angle.

The wiring area 232b of the touch panel 232 is bent by a predefined angle (e.g., 90°) from the touch detection area 232a similar to the wiring area 231b of the display panel 231 and is thus positioned between the wiring area 231b of the display panel 231 and the case 201. In this case, the wiring area 232b of the touch panel 232 may be attached to the case 201 or the wiring area 231b of the display panel 231. For example, the wiring area 231b of the display panel 231 and the wiring area 232b of the touch panel 232 are positioned between an outer side surface of the bracket 220 and an inner side surface of the case 201, as shown in FIG. 4. In this case, the wiring area 23 lb of the display panel 231 and the wiring area 232b of the touch panel 232 are bonded to the bracket 220 or the case 201 through adhesives, such as a double-sided tape.

The bracket 220 fixes the active area 231a of the flexible display panel 231. For example, the bracket 220 performs a function of preventing the active area 231a of the flexible display panel 231 from being bent due to an external force occurring by bending of the wiring area 231b. Furthermore, because the touch panel 232 is bonded to a front surface of the display panel 231, the bracket 220 performs a function of fixing the touch detection area 232a of the flexible touch panel 232. Furthermore, as described above, the bracket 220 performs a function of fixing the wiring area 231b of the display panel 231 and the wiring area 232b of the touch panel 232. For example, as shown in FIG. 4, the wiring area 231b of the display panel 231 is bonded to a side surface of the bracket 220, and the wiring area 232b of the touch panel 232 is attached to the wiring area 231b of the display panel 231. When the mobile terminal is a flexible terminal designed to bend, the bracket 220 is made of a flexible material. In this case, in a normal state in which the display panel 231 and the touch panel 232 have no external force, it is preferable that the bracket 220 is strong enough to maintain a flat state.

The protection window 241 is attached to the touch panel 232 and protects the touch panel 232. The protection window 241 is made of glass, Poly Carbonate (PC), Poly Methyl MethAcrylate (PMMA), and the like. When the mobile terminal is a flexible terminal designed to bend, the protection window 241 is made of a flexible material.

The protection window 241 and the touch panel 232, and the touch panel 232 and the display panel 231 are bonded by adhesives 260, such as an Optically Clear Adhesive (OCA), a synthetic resin, and the like. Furthermore, a buffering material 210, such as a sponge, a Poron foam, and the like, is positioned between the display panel 231 and the bracket 220.

As described above, the touch screen 230 may include a flexible display panel 231 and a flexible touch panel 232, and when the touch screen 230 is installed in the mobile terminal, some area (i.e., the wiring area 231b of the display panel 231 and the wiring area 232b of the touch panel 232) of the touch screen 230 is bent by a predefined angle from the active area 231a and the touch detection area 232a. Accordingly, a borderless touchscreen can be obtained by minimizing a border area of the mobile terminal.

FIGS. 5 through 8 are cross-sectional views illustrating a mobile terminal having a touch screen according to exemplary embodiments of the present invention.

Hereinafter, for convenience of description, a display panel and a touch panel are not separately displayed but are integrated into the touch screen and displayed by the touch screen, adhesives for bonding constituent elements are not illustrated, and a description of elements for performing the same functions as that of FIG. 4 will be omitted.

Figure 5:
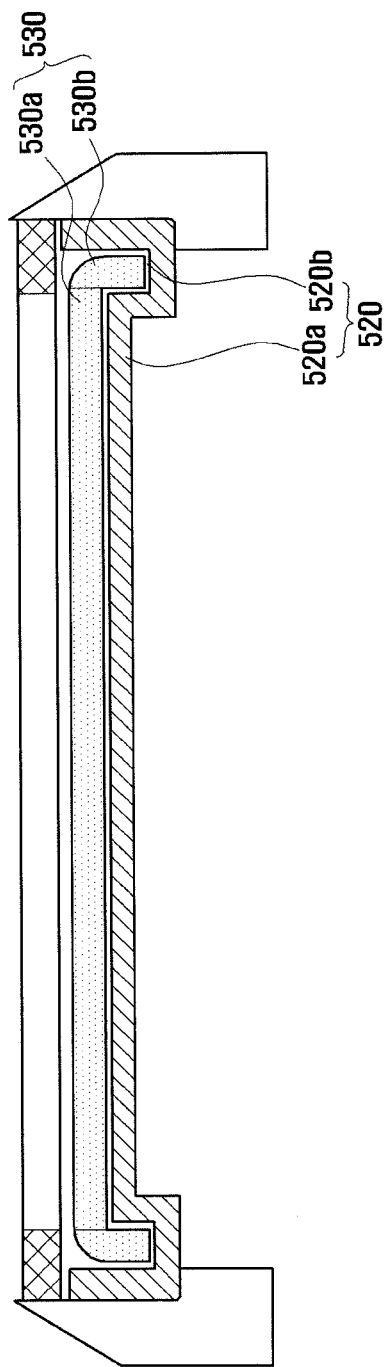
FIGS. 5 through 8 are cross-sectional views illustrating a mobile terminal having a touch screen according to exemplary embodiments of the present invention.

Referring to FIGS. 5 through 8, a touch screen 530 may include an active area 530a for displaying an image and detecting a touch and a wiring area 530b including a signal line for transmitting a touch signal and data corresponding to an image. In this case, as shown in FIG. 5, the wiring area 530b has a predefined curvature radius and is bent by a predefined angle (e.g., 90°). In this case, a bracket 520 includes a flat surface 520a for fixing the active area 530a of the touch screen 530 and a "U"-shaped groove 520b for inserting the wiring area 530b of the touch screen 530. In this way, by forming a groove 520b in the bracket 520, the wiring area 530b of the touch screen 530 is more easily fixed.

Figure 6:
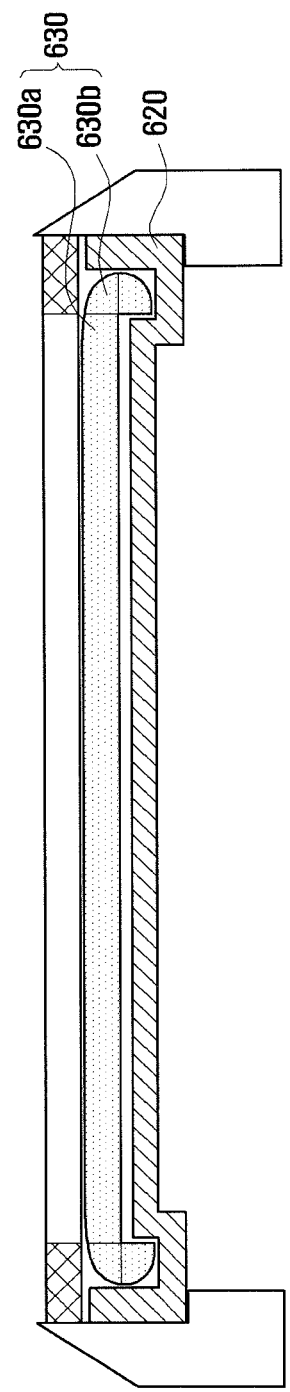

Referring to FIG. 6, a touch screen 630 may include an active area 630a for displaying an image and detecting a touch and a wiring area 630b including a signal line for transmitting a touch signal and data corresponding to an image. In this case, as shown in FIG. 6, the wiring area 630b of the touch screen 630 has a predefined curvature radius and is bent by a predefined angle (e.g., 180°) from the active area 630a. A bracket 620 has the same form as that of the bracket 520. In this way, as the wiring area 630b is bent by 180°, a thickness of the touch screen 630 can be further reduced.

Figure 7:
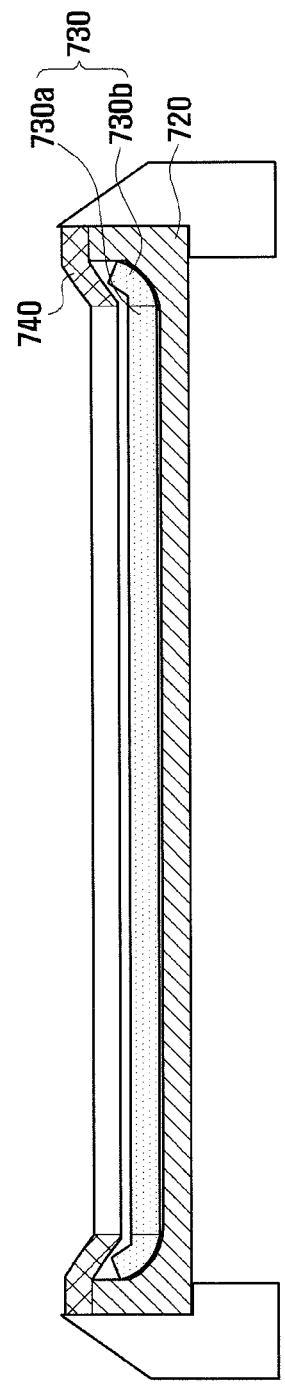

Referring to FIG. 7, a touch screen 730 may include an active area 730a for displaying an image and detecting a touch and a wiring area 730b including a signal line for transmitting a touch signal and data corresponding to an image. In this case, as shown in FIG. 7, the wiring area 730b of the touch screen 730 is bent by a predefined angle (e.g., 80°) with a predefined curvature radius upward. In this case, a bracket 720 and a protection window 740 have a form similar to a bending form of the touch screen 730. For example, as shown in FIG. 7, the bracket 720 and the protection window 740 have a 'U'-shaped form in which both side end portions are raised.

Figure 8:
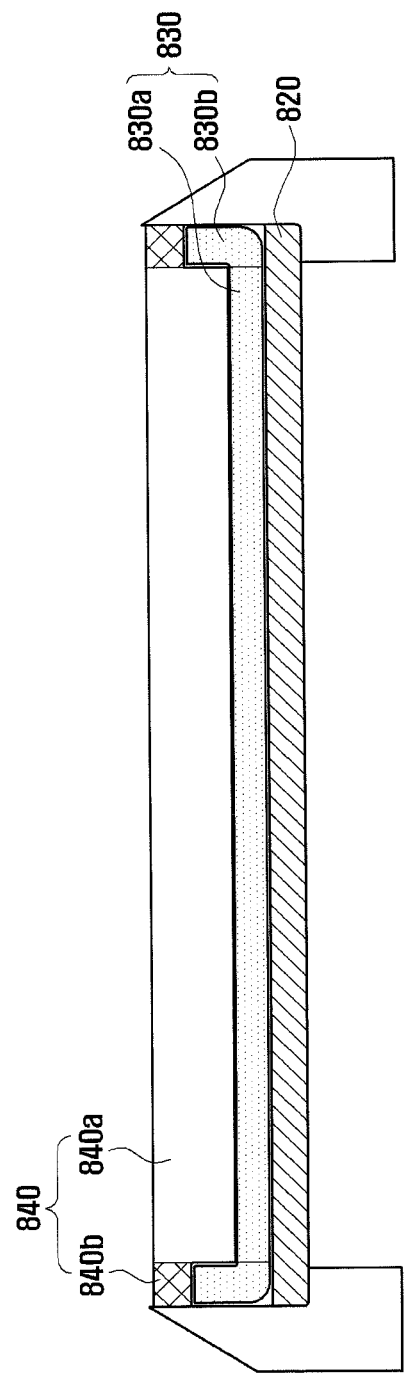

Referring to FIG. 8, a touch screen 830 may include an active area 830a for displaying an image and detecting a touch and a wiring area 830b including a signal line for transmitting a touch signal and data corresponding to an image. In this case, as shown in FIG. 8, the wiring area 830b of the touch screen 830 is bent by a predefined angle (e.g., 90°) with a predefined curvature radius upward. In this case, when a protection window 840 is fastened to the mobile terminal, the protection window 840 includes a pressing portion 840a for pressing the active area 830a of the touch screen 830 and a bent portion 840b for inserting the wiring area 830b of the touch screen 830. In order to fix the active area 830a of the touch screen 830, a bracket 820 may have a linear form.

As described above, when a touch screen is installed in a mobile terminal, some area (i.e., a wiring area) having no necessity to be exposed to a user may be bent so as not to be parallel to an area (i.e., an active area) exposed to the user. Accordingly, a border area of the mobile terminal can be minimized. By reducing the border area, design competitiveness of the mobile terminal according to the present invention can be strengthened. Furthermore, a mobile terminal having a touch screen according to an exemplary embodiment of the present invention can have a small size and a light weight, compared with another mobile terminal for providing a touch screen of the same size. Furthermore, when a mobile terminal having a touch screen according to an exemplary embodiment of the present invention has the same overall size as that of another mobile terminal, the mobile terminal can provide a relatively larger screen than that of the other mobile terminal FIG. 9 is a diagram illustrating a method of manufacturing a touch screen according to an exemplary embodiment of the present invention.

Figure 9:
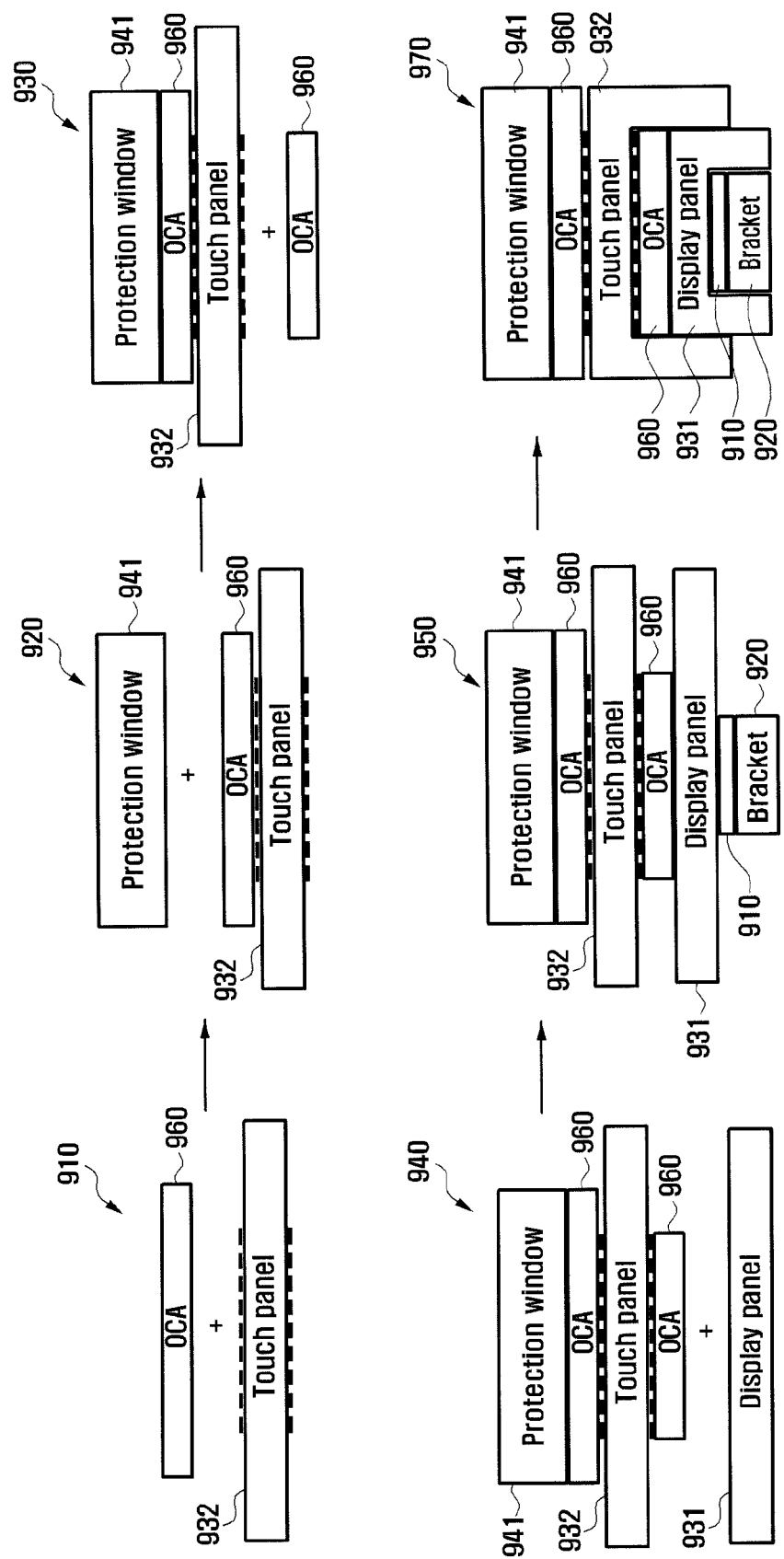
FIG. 9 is a diagram illustrating a method of manufacturing a touch screen according to an exemplary embodiment of the present invention.

Referring to FIG. 9, in a method of manufacturing a touch screen, as indicated by reference numerals 910 and 920, a flexible touch panel 932 and a protection window 941 are attached. In this case, the flexible touch panel 932 and the protection window 941 are bonded by an OCA 960. Here, the flexible touch panel 932 includes a touch detection area in which touch sensors for detecting a touch are positioned and a wiring area at which signal lines for transmitting a detected touch signal are positioned.

Thereafter, as indicated by reference numerals 930 and 940, a flexible display panel 931 is attached to a lower end portion of the flexible touch panel 932. The flexible display panel 931 and the flexible touch panel 932 are bonded by an OCA 960. Here, the flexible display panel 931 includes an active area in which an image is displayed and a wiring area at which signal lines for transmitting data corresponding to the image are positioned. An attachment order of the flexible touch panel 932, the flexible display panel 931, and the protection window 941 may be changed. For example, the protection window 941 may be attached after the flexible touch panel 932 and the flexible display panel 931 are attached.

As indicated by reference numeral 950, a bracket 920 is disposed at a lower end portion of the flexible display panel 931. In this case, a buffering material 910, such as a sponge, a Poron foam, and the like, is positioned between the flexible display panel 931 and the bracket 920.

A wiring area of the touch panel 932 and a wiring area of the display panel 931 are bent so as not to be parallel to the touch detection area and the active area. For example, as indicated by reference numeral 970, a wiring area of the touch panel 932 and a wiring area of the display panel 931 are bent and attached to a side surface of the bracket 920.

The present invention is not limited to a bending method indicated by the reference numeral 970. For example, a wiring area of the touch panel 932 and a wiring area of the display panel 931 may be bent in various forms. In another example, as shown in FIGS. 5 and 6, when the bracket has a groove for inserting a wiring area of the touch panel 932 and a wiring area of the display panel 931 in both side end portions thereof, the bracket having the groove is disposed at a lower end portion of the flexible display panel 931, and the wiring area of the touch panel 932 and the wiring area of the display panel 931 are inserted into the groove. In this case, the wiring area of the touch panel 932 and the wiring area of the display panel 931 are bent by 90° and are inserted into a groove, as shown in FIG. 5, or are bent by 180° and are inserted into a groove, as shown in FIG. 6. Alternatively, as shown in FIGS. 7 and 8, the wiring area of the touch panel 932 and the wiring area of the display panel 931 may be bent in an upper end direction at which the protection window is positioned. In this case, it is preferable that the protection window has a groove or a bending portion for inserting the wiring area of the touch panel 932 and the wiring area of the display panel 931 at both side end portions thereof.

The above-described bending method of the wiring area of the touch panel 932 and the wiring area of the display panel 931 is an example and the present invention is not limited to the above-described method. For example, the wiring area of the touch panel 932 and the wiring area of the display panel 931 may be bent so as not to be parallel to the active area and the touch detection area through various methods.

As described above, in a touch screen, a method of manufacturing the same, and a mobile terminal having the same according to an exemplary embodiment of the present invention, by bending a wiring area of a flexible display panel and a wiring area of a flexible touch panel so as not to be parallel to an active area and a touch detection area, a border area of the mobile terminal can be minimized. Accordingly, a mobile terminal of the present invention including a touch screen according to an exemplary embodiment of the present invention can strengthen design competitiveness. Furthermore, because a mobile terminal including a touch screen can minimize a border area, the mobile terminal can have a small size and a light weight, compared with another mobile terminal for providing a touch screen of the same size. Furthermore, when a mobile terminal according to the present invention has the same overall size as that of another mobile terminal, the mobile terminal can provide a relatively larger screen than that of the other mobile terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. A touch screen, comprising:
a flexible display panel comprising an active area in which an image is displayed and a wiring area comprising signal lines for transmitting data corresponding to the image;
a flexible touch panel attached to a front surface of the display panel and comprising a touch detection area at which touch sensors for detecting a touch are positioned and a wiring area at which signal lines for transmitting a touch signal are positioned; and
a bracket positioned at a lower end portion of the flexible display panel and for flatly fixing the flexible display panel,
wherein the wiring area of the display panel and the wiring area of the touch panel are bent so as not to be parallel to the active area and the touch detection area, and
wherein the bracket comprises a groove for inserting the wiring area of the display panel and the wiring area of the touch panel.
2. The touch screen of claim 1, further comprising:
a protection window attached to the flexible touch panel and for protecting the flexible touch panel.
3. The touch screen of claim 1, wherein the wiring area of the display panel and the wiring area of the touch panel are positioned between an outer side surface of the bracket and an inner side surface of a case of the touch screen.
4. The touch screen of claim 1, wherein the protection window comprises a groove for inserting the wiring area of the display panel and the wiring area of the touch panel.
5. The touch screen of claim 1, wherein the protection window and the bracket are made of a flexible material.
6. The touch screen of claim 1, wherein in the flexible touch panel, a driving channel for recognizing the abscissa and a detecting channel for recognizing the ordinate are formed with a metal mesh.
7. A mobile terminal in which a flexible touch screen is installed, wherein the touch screen comprises:
a flexible display panel comprising an active area in which an image is displayed and a wiring area at which signal lines for transmitting data corresponding to the image are positioned; and
a flexible touch panel attached to a front surface of the display panel and comprising a touch detection area at which touch sensors for detecting a touch are positioned and a wiring area at which signal lines for transmitting a touch signal are positioned, wherein the wiring area of the display panel and the wiring area of the touch panel are bent so as not to be parallel to the active area and the touch detection area, wherein the touch screen further comprises a bracket positioned at a lower end portion of the flexible display panel and for flatly fixing an active area of the flexible display panel, and wherein the bracket comprises a groove for inserting the wiring area of the display panel and the wiring area of the touch panel.

8. The mobile terminal of claim 7, wherein the touch screen further comprises a protection window attached to the flexible touch panel and for protecting the flexible touch panel.

9. The mobile terminal of claim 7, wherein the wiring area of the display panel and the wiring area of the touch panel are positioned between an outer side surface of the bracket and an inner side surface of a case of the mobile terminal.

10. The mobile terminal of claim 7, wherein the protection window comprises a groove for inserting the wiring area of the display panel and the wiring area of the touch panel.

11. The mobile terminal of claim 7, wherein the protection window, the bracket, and a case of the mobile terminal are made of a flexible material.

12. The mobile terminal of claim 7, wherein in the flexible touch panel, a driving channel for recognizing the abscissa and a detecting channel for recognizing the ordinate are formed with a metal mesh.

13. A method of manufacturing a touch screen, the method comprising:

stacking a flexible display panel comprising an active area in which an image is displayed and a wiring area at which signal lines for transmitting data corresponding to the image are positioned and a flexible touch panel comprising a touch detection area at which touch sensors for detecting a touch are positioned and a wiring area at which signal lines for transmitting a touch signal are positioned;

bending the wiring area of the display panel and the wiring area of the touch panel so as not to be parallel to the active area and the touch detection area;

disposing a bracket for fixing the display panel at a lower end portion of the display panel; and bending the wiring area of the display panel and the wiring area of the touch panel at a side surface of the bracket, wherein the bracket comprises a groove for inserting the wiring area of the display panel and the wiring area of the touch panel.

14. The method of claim 13, wherein the bending of the wiring area of the display panel and the wiring area of the touch panel so as not to be parallel to the active area and the touch detection area comprises:

stacking the bracket comprising both side end portions at a lower end portion of the display panel; and inserting the wiring area of the display panel and the wiring area of the touch panel into the groove of the bracket.

15. The method of claim 13, further comprising:

attaching a protection window for protecting the touch panel to an upper end portion of the touch panel.

\* \* \* \* \*